No. 673,223. Patented Apr. 30, 1901.
L. A. ROBY & W. C. BRUCE.
GRINDING MACHINE.
(Application filed Dec. 21, 1899.)
(No Model.) 2 Sheets—Sheet 1.
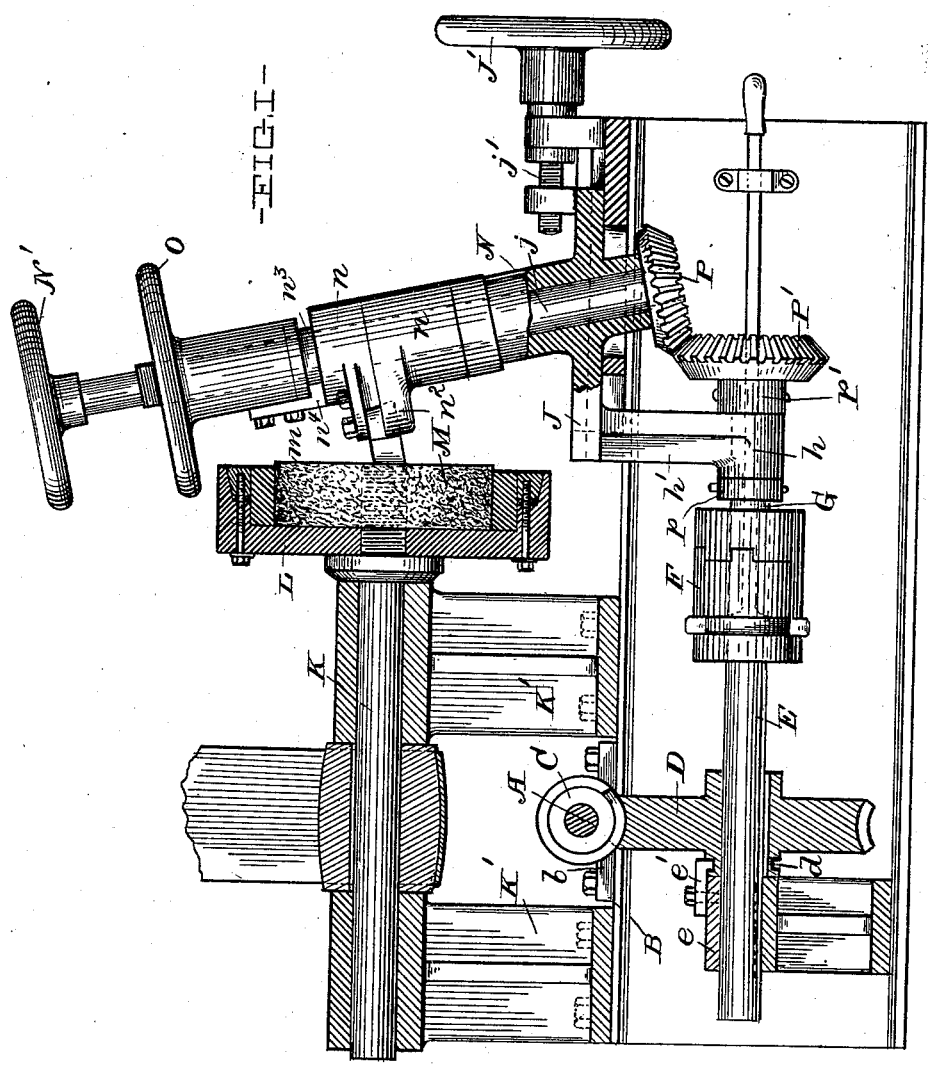
Witnesses
J. C. Turner
D. T. Davies
Inventors
L. A. Roby and
W. C. Bruce
By J. B. Fay
Atty.

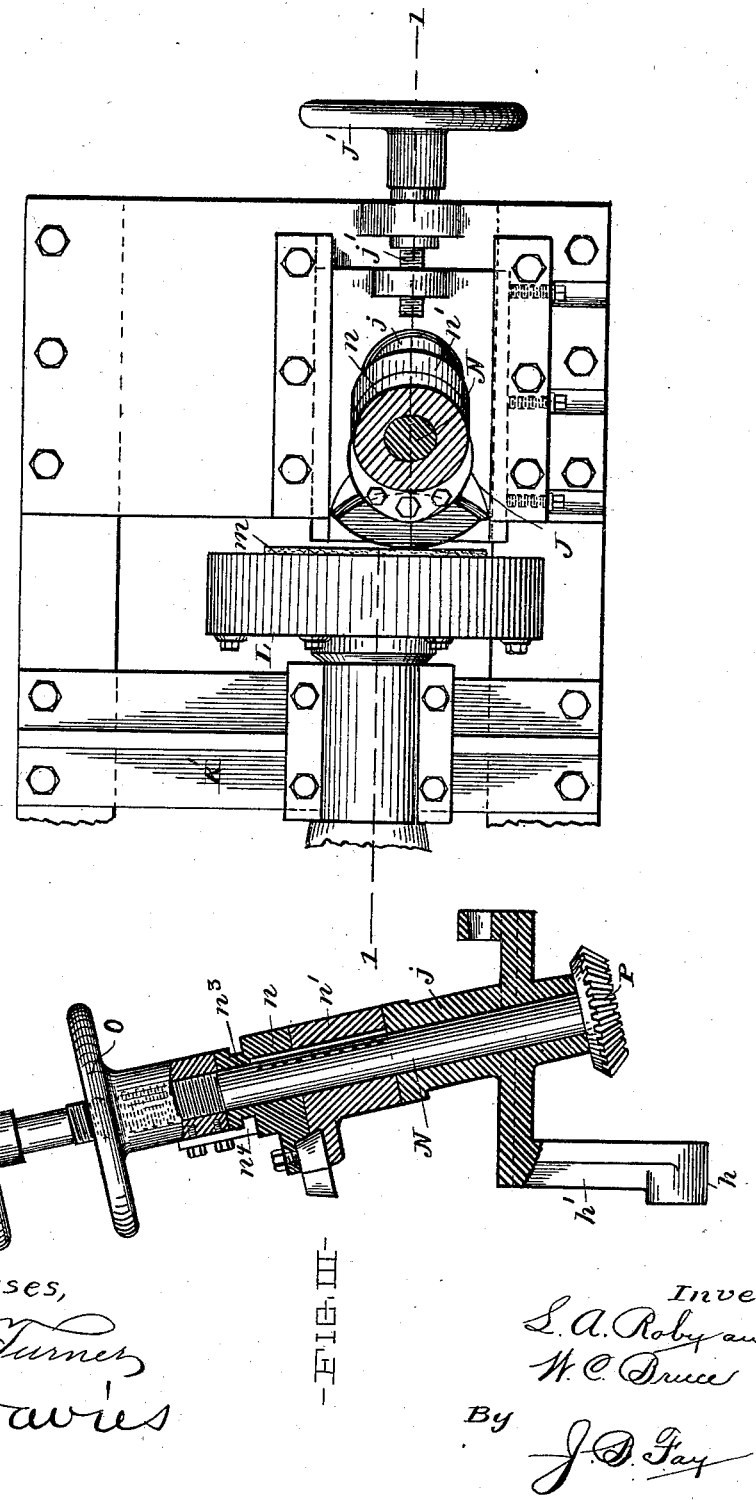

UNITED STATES PATENT OFFICE.

LUTHER A. ROBY, OF CLEVELAND, AND WILLIAM C. BRUCE, OF CHAGRIN FALLS, OHIO, ASSIGNORS TO THE FERROSTEEL COMPANY, OF CLEVELAND, OHIO.

GRINDING-MACHINE.

SPECIFICATION forming part of Letters Patent No. 673,223, dated April 30, 1901.

Application filed December 21, 1899. Serial No. 741,081. (No model.)

*To all whom it may concern:*

Be it known that we, LUTHER A. ROBY, residing at Cleveland, and WILLIAM C. BRUCE, residing at Chagrin Falls, in the county of Cuyahoga and State of Ohio, citizens of the United States, have invented a new and useful Improvement in Grinding-Machines, of which the following is a specification, the principle of the invention being herein explained and the best mode in which we have contemplated applying that principle, so as to distinguish it from other inventions.

Our invention relates to machines for grinding the lateral inclined surfaces of sad-irons; and it consists of means hereinafter fully described.

The annexed drawings and the following description set forth in detail certain mechanism embodying the invention, such disclosed means constituting but one of various mechanical forms in which the principle of the invention may be used.

In said annexed drawings, Figure I represents a partial longitudinal central section of our invention, taken upon line 1 1, Fig. II, said latter figure representing a top plan of the right-hand end of the device illustrated in Fig. I. Fig. III represents a partial axial section of the slide and sad-iron-gripping device.

A driving-shaft A is mounted in a bearing $b$, secured to the frame B of the machine, and has a worm C secured thereto, which engages a wheel D, slidably mounted upon a second shaft E by means of a groove and feather. Said shaft E is mounted at one end in a bearing $e$ and has rotatively secured to the opposite end one member of a suitable clutch F. The wheel D and bearing $e$ are held relatively stationary in the direction of the axis of shaft E by means of an angle-piece $e'$ and groove $d$, Fig. I. A third shaft, G, having its axis coincident with that of shaft E, has secured upon the end adjacent to the above-mentioned clutch member the second member of the clutch F and is mounted in a bearing $h$, formed in a hanger $h'$, depending from a slide J, mounted in suitable ways formed upon the frame or bed-plate of the machine. A spindle K is mounted in suitable bearings in standards K', bolted to the machine-frame, as shown in Fig. I. Upon one end of said spindle K is mounted a chuck L, which secures an annular grinding-ring M, having a plain grinding-surface $m$, perpendicular to the axis of spindle K.

Upon the slide J is formed or secured a bearing $j$, inclined to said grinding-surface $m$, in which bearing is journaled a spindle N, whose axis of rotation is hence also inclined to said grinding-surface.

Upon the upper surface of the bearing $j$ is mounted a sad-iron-clamping device rotatively secured to spindle N by means of a groove and feather, Fig. III. Said device consists of two members, an upper member $n$ and a lower member $n'$, each formed with a clamping-surface $n^2$, oppositely located, as shown in Fig. III. The upper member $n$ is formed with a circumferential groove $n^3$, which engages an angle-piece $n^4$, secured to the hub of a hand-wheel O, having screw-thread engagement with the upper end of spindle N, as shown in Fig. III, the said hand-wheel thereby rotatively engaging the upper member of said gripping device, whereby said hand-wheel and upper member are rotatively engaged, but fixed relatively to each other in the direction of the spindle-axis, so that the upper member may be caused to approach or retract from the lower by turning the said hand-wheel.

Upon the lower end of spindle N is secured a bevel-gear P, which meshes with a second bevel-gear P', secured to the adjacent end of shaft G, as shown in Fig. I.

A hand-wheel J' upon a screw $j'$, suitably mounted, permits the slide J to be advanced toward or retracted from the grinding-surface $m$.

Two collars $p$ and $p'$ are secured one in each side of the bearing in the hanger $h'$, and suitable means are employed to cause the two shafts E and G to be rotatively independent of each other during the non-engagement of the clutch members, but fixed relatively to each other in the direction of their common axis.

Suitable lever mechanism is provided to throw the two clutch members into and out of engagement.

The axis of the spindle N is located in a plane without the perpendicular plane passing through the axis of spindle K, but preferably parallel therewith, so that a sad-iron clamped between the clamping-surface of the clamping device may be revolved about the axis of spindle N in the vicinity of the annular grinding-surface of the grinding-wheel, as shown in Fig. II. Upon the upper end of the spindle N is secured a hand-wheel N', as shown in Figs. I and III.

In operating the machine the upper and lower surfaces of a sad-iron are clamped between the clamping-surfaces $n^2$, power transmitted from the driving-shaft to the spindle N, which by the nature of the gearing is caused to slowly rotate, causing the clamping device and the sad-iron to revolve. By advancing the slide toward the grinding-wheel one side of the sad-iron may be brought into contact with the grinding-surface and ground, such ground surface having an inclination to the sad-iron axis equal to the inclination of the spindle N to the grinding-surface $m$. One side having been ground, the sad-iron is released, reversed, and the opposite side submitted to the above-described operation.

When it is desired to operate the machine without the use of the automatic mechanism for revolving the sad-iron, the clutch is thrown out of gear and the revolving movement imparted by the use of the hand-wheel N', such hand operation sometimes being convenient in the grinding process.

Other modes of applying the principle of our invention may be employed instead of the one explained, change being made as regards the mechanism herein disclosed, provided the means covered by any one of the following claims be employed.

We therefore particularly point out and distinctly claim as our invention—

1. The combination of a grinding-wheel having a plane grinding-surface, a cross-slide having a rigid inclined bearing, a spindle mounted in said bearing, a rotatable gripping device for gripping sad-irons, the axis of rotation of said gripping device being inclined to the said grinding-surface, and means for rotating said device, substantially as set forth.

2. The combination of a grinding-wheel having a plane grinding-surface, an inclined bearing, a spindle mounted in said bearing and normally inclined with respect to the grinding-wheel, a rotatable gripping device surrounding the spindle intermediate its length for gripping sad-irons, the axis of rotation of said gripping device inclined to the said grinding-surface and without a plane parallel with it and passing through the grinding-wheel axis, and means for rotating said device, substantially as set forth.

3. The combination of a cross-slide, a grinding-wheel, means for advancing said slide toward and retracting it from said wheel, a spindle mounted in a bearing secured to said slide, a sad-iron-gripping device feathered on said spindle, a hand-wheel having screw-thread engagement with said spindle and rotatively engaging said gripping device whereby the latter and said hand-wheel are caused to remain relatively fixed in the direction of the spindle-axis, and suitable means for rotating said spindle whereby said gripping device may be rotated, substantially as set forth.

4. The combination of a cross-slide, a grinding-wheel, means for advancing said slide toward and retracting it from said wheel, a spindle mounted in a bearing secured to said cross-slide, a sad-iron-gripping device secured to said spindle, means for automatically rotating the spindle and hand-wheel connected therewith, driving means and clutch mechanism connecting said driving means and spindle-rotating means, whereby said driving means may be thrown out of gear and the spindle rotated by said hand-wheel, substantially as set forth.

Signed by us this 30th day of September, 1899.

LUTHER A. ROBY.
WILLIAM C. BRUCE.

Attest:
D. T. DAVIES,
A. E. MERKEL.